US007734450B2

(12) United States Patent
Murakawa et al.

(10) Patent No.: US 7,734,450 B2
(45) Date of Patent: Jun. 8, 2010

(54) WELDING DEFORMATION COMPUTING METHOD, WELDING DEFORMATION COMPUTING DEVICE, AND COMPUTER PROGRAM PRODUCT

(75) Inventors: Hidekazu Murakawa, Ibaraki (JP); Hisashi Serizawa, Ibaraki (JP)

(73) Assignee: Osaka Industrial Promotion Organization, Osaka (JP)

( * ) Notice: Subject to any disclaimer, the term of this patent is extended or adjusted under 35 U.S.C. 154(b) by 703 days.

(21) Appl. No.: 11/547,196

(22) PCT Filed: Mar. 22, 2005

(86) PCT No.: PCT/JP2005/005155

§ 371 (c)(1),
(2), (4) Date: Sep. 29, 2006

(87) PCT Pub. No.: WO2005/093612

PCT Pub. Date: Oct. 6, 2005

(65) Prior Publication Data

US 2008/0262799 A1 Oct. 23, 2008

(30) Foreign Application Priority Data

Mar. 29, 2004 (JP) .............................. 2004-095396

(51) Int. Cl.
*G06F 17/50* (2006.01)
*B23K 20/12* (2006.01)

(52) U.S. Cl. ................ 703/2; 703/7; 148/558; 228/112

(58) Field of Classification Search ............... 703/2, 703/5–8; 148/558; 228/112
See application file for complete search history.

(56) References Cited

U.S. PATENT DOCUMENTS 5,215,245 A * 6/1993 Moyer .................... 228/152

(Continued)

FOREIGN PATENT DOCUMENTS

JP 10-146689 A 6/1998

(Continued)

OTHER PUBLICATIONS

Murakawa et al., The Kansai Society of Naval Architects, Japan 2004 Nendo Shuki Koenkai Keon Gaisetsushu, Oct. 8, 2004, pp. 83-85.

(Continued)

*Primary Examiner*—Thai Phan
(74) *Attorney, Agent, or Firm*—Birch, Stewart, Kolasch & Birch, LLP

(57) ABSTRACT

A region for which nonlinear analysis should be carried out is extracted and welding deformation of only the extracted region is computed by nonlinear analysis. Specifically, the displacement and reaction force at the limit surface are computed by linear analysis of the object to be welded, the reaction force at the limit surface is computed by nonlinear analysis of the region for which nonlinear analysis is necessary, an amount of correction of the displacement at the limit surface is computed and the above processing is repeated when it is judged that a difference between the two reaction forces is larger than a predetermined value, and welding deformation of the object to be welded is computed based on the computed displacement if it is judged that the difference between the reaction forces is smaller than the predetermined value.

3 Claims, 6 Drawing Sheets

U.S. PATENT DOCUMENTS

| | | |
|---|---|---|
| 6,789,051 B1 | 9/2004 | Chen et al. |
| 6,932,876 B1* | 8/2005 | Statnikov .................... 148/558 |
| 7,523,850 B2* | 4/2009 | Barnes .................... 228/112.1 |
| 7,576,728 B2* | 8/2009 | Inoke et al. ................. 345/158 |
| 2004/0068341 A1* | 4/2004 | Minucciani et al. ......... 700/110 |

FOREIGN PATENT DOCUMENTS

| | | |
|---|---|---|
| JP | 2003-80393 A | 3/2003 |
| JP | 2003-512180 A | 4/2003 |
| JP | 2003-194637 A | 7/2003 |

OTHER PUBLICATIONS

Nishikawa et al., Paper No. 2004—JSC-255, pp. 1-7.

Tanaka et al., "Thermo-elasto-plastic Analysis for a Thin Plate by a Laser Beam: (Evaluation of Residual Stress and Deformation by a Single Irradiation)", Koen Ronbunshu of the Japan Society of Mechanical Engineering Annual Meeting, vol. 2000, No. 3, Jul. 31, 2000, pp. 267-268.

Terasaki et al., "Study on Accurate Numerical Analysis of Welding Residual Stress and Welding Deformation Generated in Bead-on-Plate", Journal of the Japan Society of Naval Architects and Ocean Engineers, Jun. 2002, vol. 191, pp. 239-245.

* cited by examiner

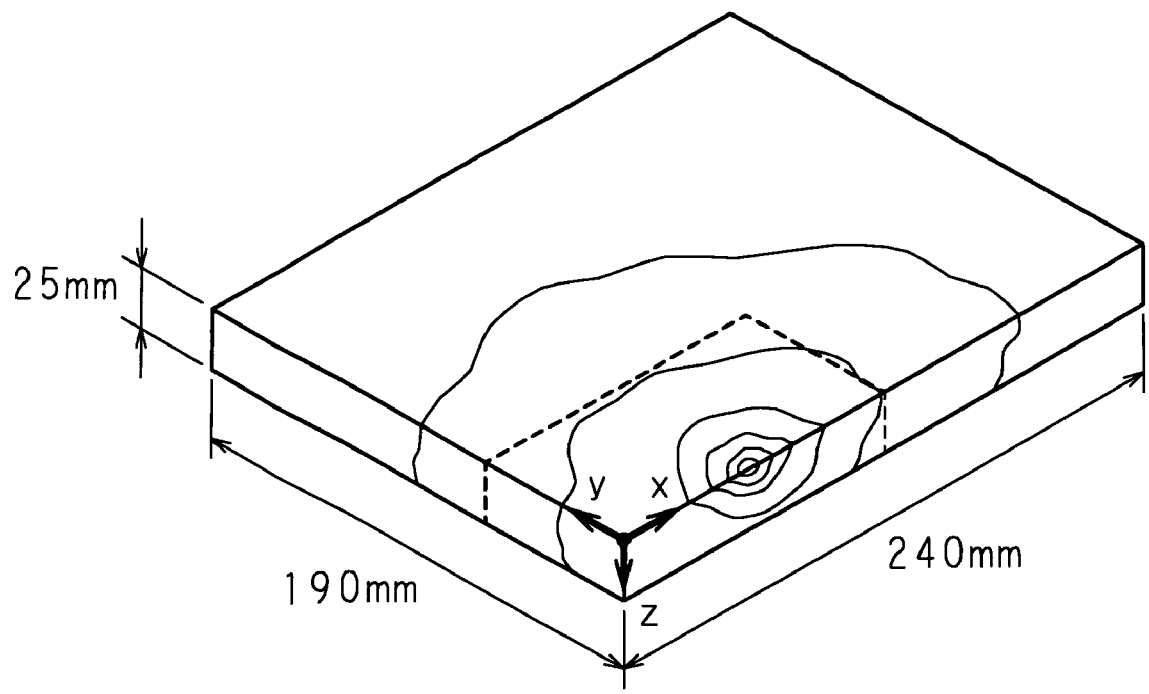
F I G. 3

US 7,734,450 B2

WELDING DEFORMATION COMPUTING METHOD, WELDING DEFORMATION COMPUTING DEVICE, AND COMPUTER PROGRAM PRODUCT

CROSS-REFERENCE TO RELATED APPLICATIONS

This application is the national phase under 35 U.S.C, §371 of PCT International Application No. PCT/JP05/005155 which has an International filing date of Mar. 22, 2005 and designated the United States of America.

BACKGROUND OF THE INVENTION

1. Field of the Invention

The present invention relates to a welding deformation computing method, a welding deformation computing device, and a computer program product for reducing a computation time of welding deformation when compared with a case in which nonlinear analysis is carried out for a whole region by dividing a structure, which is an object to be welded, into a region for which nonlinear analysis is necessary and a region for which linear analysis is sufficient and partly carrying out nonlinear analysis.

2. Description of Related Art

When building a welded structure using metallic material, deformation resulting from local heat history (hereinafter referred to as welding deformation) inevitably appears in structural members. Such welding deformation causes dimension errors, shape errors and the like of products and is directly linked to degradation in quality of products. Welding deformation also causes gaps, dislocations and the like between structural members in a production process and is one of factors that lie in the way of robotization and automation.

Therefore, if a degree of welding deformation can be predicted quantitatively and accurately, reduction of rework processes, promotion of robotization and automation and the like in producing a welded structure can be sought, and thus predicting a degree of welding deformation accurately is one of important tasks in production of welded structures.

To predict a degree of welding deformation accurately, nonlinear analysis must be carried out and a finite element method (hereinafter referred to as FEM) is frequently used. Also, a linear finite element method is often used as an approximate method by which local deformation such as transverse contraction, angular deformation, and longitudinal contraction generated near a welded portion is assumed as a known amount and deformation generated by such local deformation is linearly superimposed.

However, a large amount of processing time is necessary for computation of nonlinear analysis if a method is used by which nonlinear analysis is carried out in reference to the above-described welded structure, which is the object to be welded. In addition, if a deducing method of welding deformation using the linear finite element method is applied, there has been a problem that deducing accuracy may vary depending on how long a welded length is and it is difficult to maintain a certain level of deducing accuracy.

Though it is possible to compute welding deformation with high precision when nonlinear analysis using FEM is carried out in all regions of a welded structure, the degree n (n is a natural number) of simultaneous equations to be solved becomes larger and a computation time is proportional to $n^3$.

Also, when nonlinear analysis is carried out, a whole welding process is divided by a short time interval into $m_s$ ($m_s$ is a natural number) steps and convergence computation is repeated $m_i$ ($m_i$ is a natural number) times sequentially in each step. Therefore, since the computation time increases in proportion to the following equation (1), the amount of consumption of computer resources becomes huge. When computing welding deformation of a large welded structure, for example, a result is actually computed only after a lapse of three days to one week.

$$n^3 \times m_s \times m_i \tag{1}$$

BRIEF SUMMARY OF THE INVENTION

The present invention has been developed in view of such circumstances, and an object thereof is to provide a welding deformation computing method, a welding deformation computing device, and a computer program product for computing welding deformation in a relatively short time while maintaining the high deducing accuracy of the welding deformation by convergence computation in such a way that nonlinear analysis of only a portion near the welded portion is carried out to maintain continuity with the linear analysis result.

To achieve the above object, a welding deformation computing method according to a first aspect of the present invention is a welding deformation computing method for computing welding deformation of an object to be welded, and is characterized by including: an extracting step for extracting a nonlinear region for which nonlinear analysis should be carried out in said object to be welded; and a computing step for computing welding deformation of said nonlinear region by carrying out nonlinear analysis.

A welding deformation computing device according to the first aspect of the present invention is a welding deformation computing device for computing welding deformation of an object to be welded, and is characterized by comprising: extracting means for extracting a nonlinear region for which nonlinear analysis should be carried out in said object to be welded; and computing means for computing welding deformation of said nonlinear region by carrying out nonlinear analysis.

A computer program product according to the first aspect of the present invention is a computer program product for controlling a computer in such a way that welding deformation of an object to be welded is computed, and is characterized in that the computer program product comprises: a computer readable storage medium having computer readable program code means embodied in said medium, said computer readable program code means comprising the computer instructions means for: extracting a nonlinear region for which nonlinear analysis should be carried out in said object to be welded; and computing welding deformation of said nonlinear region by nonlinear analysis.

In the welding deformation computing method, welding deformation computing device and computer program product according to the first aspect of the present invention, a nonlinear region for which nonlinear analysis should be carried out is extracted from an object to be welded and welding deformation of only the extracted nonlinear region is computed by nonlinear analysis.

The welding deformation computing method according to a second aspect of the present invention is, in the welding deformation computing method of the first aspect, characterized in that wherein welding deformation of said object to be welded is computed in time sequence.

The welding deformation computing device according to the second aspect of the present invention is, in the welding deformation computing device of the first aspect, characterized in that welding deformation of said object to be welded is computed in time sequence.

The computer program product according to the second aspect of the present invention is, in the computer program product of the first aspect, characterized in that welding deformation of said object to be welded is computed in time sequence.

In the welding deformation computing method, welding deformation computing device and computer program product according to the second aspect of the present invention, welding deformation of the object to be welded is computed in time sequence.

The welding deformation computing method according to a third aspect of the present invention is, in the welding deformation computing method of the first aspect, characterized in that said extracting step includes a limit surface specifying step for specifying a limit surface representing a limit of said nonlinear region based on at least one of a stress distribution of said object to be welded and a temperature distribution of said object to be welded.

The welding deformation computing device according to the third aspect of the present invention is, in the welding deformation computing device of the first aspect, characterized in that said extracting means includes limit surface specifying means for specifying a limit surface representing a limit of said nonlinear region based on at least one of a stress distribution of said object to be welded and a temperature distribution of said object to be welded.

The computer program product according to the third aspect of the present invention is, in the computer program product of the first aspect, characterized in that said computer instruction means for extracting specifies a limit surface representing a limit of said nonlinear region based on at least one of a stress distribution of said object to be welded and a temperature distribution of said object to be welded.

In the welding deformation computing method, welding deformation computing device and computer program product according to the third aspect of the present invention, a limit surface representing a limit of a region for which nonlinear analysis is necessary is specified in reference to at least one of a stress distribution and a temperature distribution of the object to be welded.

The welding deformation computing method according to a fourth aspect of the present invention is, in the welding deformation computing method of the third aspect, characterized by further including: a linear displacement computing step for computing displacement of said limit surface by linear analysis; a first reaction force computing step for computing a first reaction force from said limit surface to said nonlinear region by linear analysis; a second reaction force computing step for computing a second reaction force from said nonlinear region to said limit surface by nonlinear analysis based on the displacement of said limit surface computed in said linear displacement computing step; a difference computing step for computing a difference between said first reaction force and said second reaction force; a judging step for judging whether a magnitude of the difference computed in said difference computing step is larger than a predetermined value; a correcting step for correcting the displacement of said limit surface specified in said limit surface specifying step based on the magnitude of the difference computed in said difference computing step when it is judged in said judging step that the magnitude of said difference is larger than said predetermined value; and a welding deformation computing step for computing welding deformation of said object to be welded based on the deformation of said limit surface computed in said linear displacement computing step when it is judged in said judging step that the magnitude of said difference is not larger than said predetermined value.

The welding deformation computing device according to the fourth aspect of the present invention is, in the welding deformation computing device of the third aspect, characterized by further comprising: linear displacement computing means for computing displacement of said limit surface by linear analysis; first reaction force computing means for computing a first reaction force from said limit surface to said nonlinear region by linear analysis; second reaction force computing means for computing a second reaction force from said nonlinear region to said limit surface by nonlinear analysis based on the displacement of said limit surface computed by said linear displacement computing means; difference computing means for computing a difference between said first reaction force and said second reaction force; judging means for judging whether a magnitude of the difference computed by said difference computing means is larger than a predetermined value; correcting means for correcting the displacement of said limit surface specified by said limit surface specifying means based on the magnitude of the difference computed by said difference computing means when it is judged by said judging means that the magnitude of said difference is larger than said predetermined value; and welding deformation computing means for computing welding deformation of said object to be welded based on the deformation of said limit surface computed by said linear displacement computing means when it is judged by said judging means that the magnitude of said difference is not larger than said predetermined value.

The computer program product according to the fourth aspect of the present invention is, in the computer program product of the third aspect, characterized by further comprising the computer instruction means for: computing displacement of said limit surface by linear analysis; computing a first reaction force from said limit surface to said nonlinear region by linear analysis; computing a second reaction force from said nonlinear region to said limit surface by nonlinear analysis based on said computed displacement of the limit surface; computing a difference between said first reaction force and said second reaction force; judging whether a magnitude of said difference is larger than a predetermined value; correcting said displacement of said limit surface based on the magnitude of said difference when it is judged that the magnitude of said difference is larger than said predetermined value; and computing welding deformation of said object to be welded based on the displacement of said limit surface when it is judged that the magnitude of said difference is not larger than said predetermined value.

In the welding deformation computing method, welding deformation computing device and computer program product according to the fourth aspect of the present invention, displacement at the limit surface is computed using linear analysis, and a first reaction force from the limit surface to the nonlinear region and a second reaction force from the nonlinear region to the limit surface are computed. A difference between the two computed reaction forces is computed and, when the difference between the reaction forces is larger than a predetermined value, the displacement at the limit surface is corrected based on a magnitude of the difference between the two reaction forces. When, on the other hand, the difference between the two computed reaction forces is not larger than the predetermined value, welding deformation is computed based on the displacement at the limit surface. This makes it possible to compute welding deformation by applying nonlinear analysis to a region for which nonlinear analysis is necessary and linear analysis to regions outside the region involving nonlinear analysis for which deformation can reasonably accurately be computed by carrying out only linear analysis respectively. Therefore, there is no need for carrying out nonlinear analysis, which consumes the computing time, for the whole object to be welded and the computation time of welding deformation can be reduced without consuming computer resources uselessly.

According to the welding deformation computing method, welding deformation computing device and computer program product of the first aspect of the present invention, nonlinear analysis is applied only to a region for which nonlinear analysis is necessary to compute welding deformation so that there is no need for carrying out nonlinear analysis, which consumes the computing time, for the whole object to be welded and the computation time of welding deformation can be reduced without consuming computer resources uselessly.

According to the welding deformation computing method, welding deformation computing device and computer program product of the second aspect of the present invention, welding deformation of the object to be welded can be computed in time sequence.

According to the welding deformation computing method, welding deformation computing device and computer program product of the third aspect of the present invention, the limit surface representing the limit of a region for which nonlinear analysis is necessary is specified in reference to at least one of the stress distribution, for example, whether a stress exceeds the yield stress, and the temperature distribution of the object to be welded. This makes it possible to maintain computing accuracy of the welding deformation by carrying out nonlinear analysis for regions including at least one of a region in which a stress is larger than the yield stress and thus linear analysis cannot be carried out and a region in which a change in physical properties has occurred due to heat characteristics and to reduce the computing time of welding deformation by carrying out linear analysis for other regions.

According to the welding deformation computing method, welding deformation computing device and computer program product of the fourth aspect of the present invention, welding deformation is computed by applying nonlinear analysis to a region for which nonlinear analysis is necessary and linear analysis to regions outside the region involving nonlinear analysis for which deformation can reasonably accurately be computed by carrying out only linear analysis respectively. Therefore, there is no need for carrying out nonlinear analysis, which consumes the computing time, for the whole object to be welded and the computation time of welding deformation can be reduced without consuming computer resources uselessly.

The above and further objects and features of the invention will more fully be apparent from the following detailed description with accompanying drawings.

BRIEF DESCRIPTION OF THE SEVERAL VIEWS OF THE DRAWINGS

FIG. 3 is a diagram illustrating a temperature distribution when welding heat input is executed;

DETAILED DESCRIPTION OF THE PRESENT INVENTION

Figure 1:
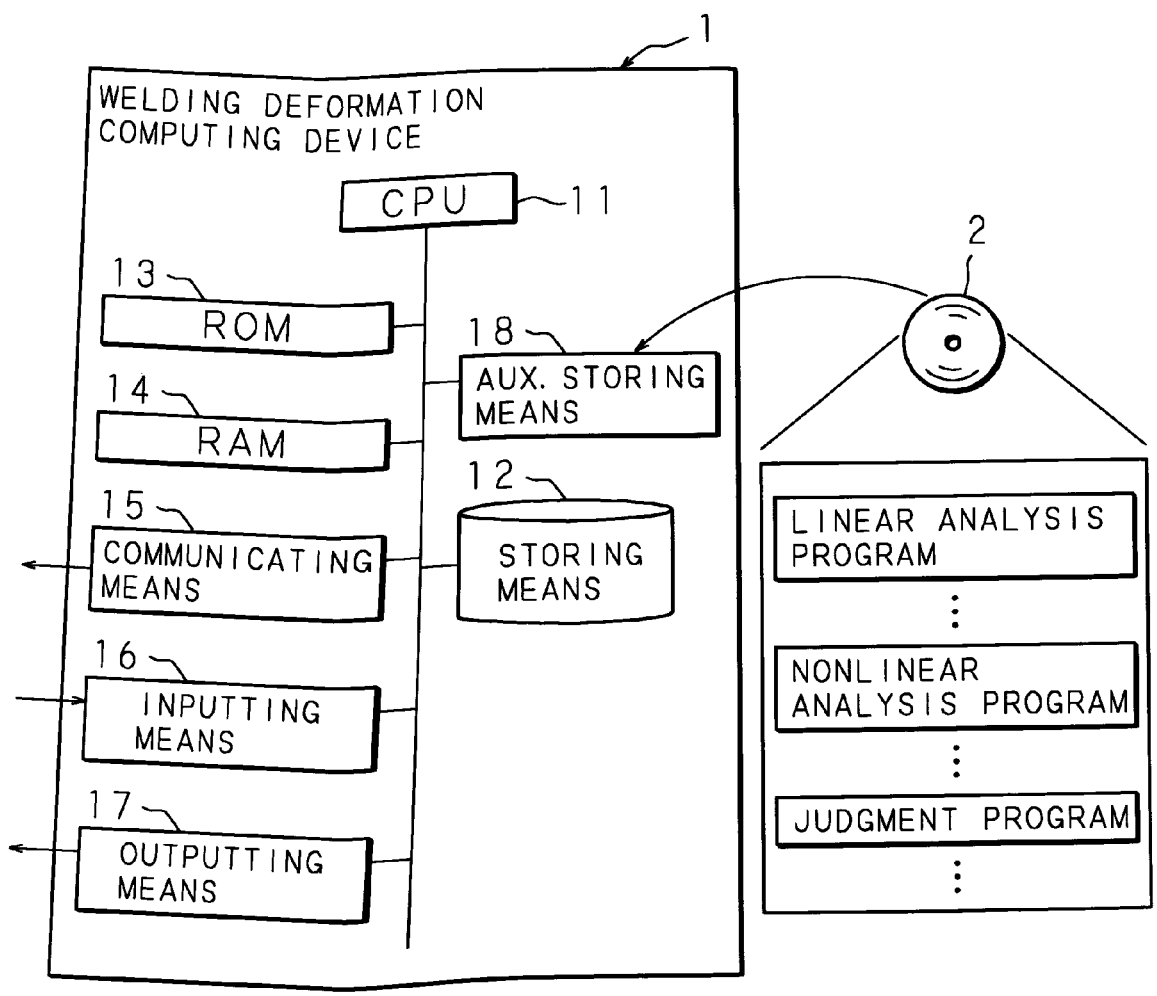
FIG. 1 is a block diagram showing a configuration of a welding deformation computing device according to an embodiment of the present invention.

The present invention will be described below with reference to drawings showing an embodiment thereof. FIG. 1 is a block diagram showing a configuration of a welding deformation computing device according to an embodiment of the present invention. In FIG. 1, the welding deformation computing device 1 is configured by at least a CPU (central processing unit) 11, storing means 12, a ROM 13, a RAM 14, communicating means 15 for connecting to a communication line, inputting means 16 such as a mouse, keyboard and the like, outputting means 17 such as a display and the like, and auxiliary storing means 18.

The CPU 11 is connected to the above-described hardware components of the welding deformation computing device 1 via a bus, and controls the above-described hardware components and executes various software functions according to a control program stored in the ROM 13 or a control program installed into the storing means 12 using a (portable) recording medium 2 such as CD-ROM and DVD, which are auxiliary storing means 18. The storing means 12 is a fixed type storage medium like a hard disk and stores, in addition to the above-described control program, data necessary for processing in advance.

The RAM 14 is comprised of an SRAM, a flash memory and the like and stores temporary data generated during execution of software. The communicating means 15 is connected to the bus, and obtains data from outside and transmits/receives operation control data and the like of external devices.

The inputting means 16 is an input medium such as a keyboard having character keys, ten keys, various function keys and the like necessary for operating the welding deformation computing device 1, mouse and the like. The outputting means 17 is a display device such as a liquid crystal display device or CRT display, and displays an operating state of the welding deformation computing device 1, a screen prompting for user's operation input, and image data. By adopting a touch panel type for the outputting means 17, the outputting means 17 can be used as a substitute for part or all of various function keys of the inputting means 16.

Figure 2:
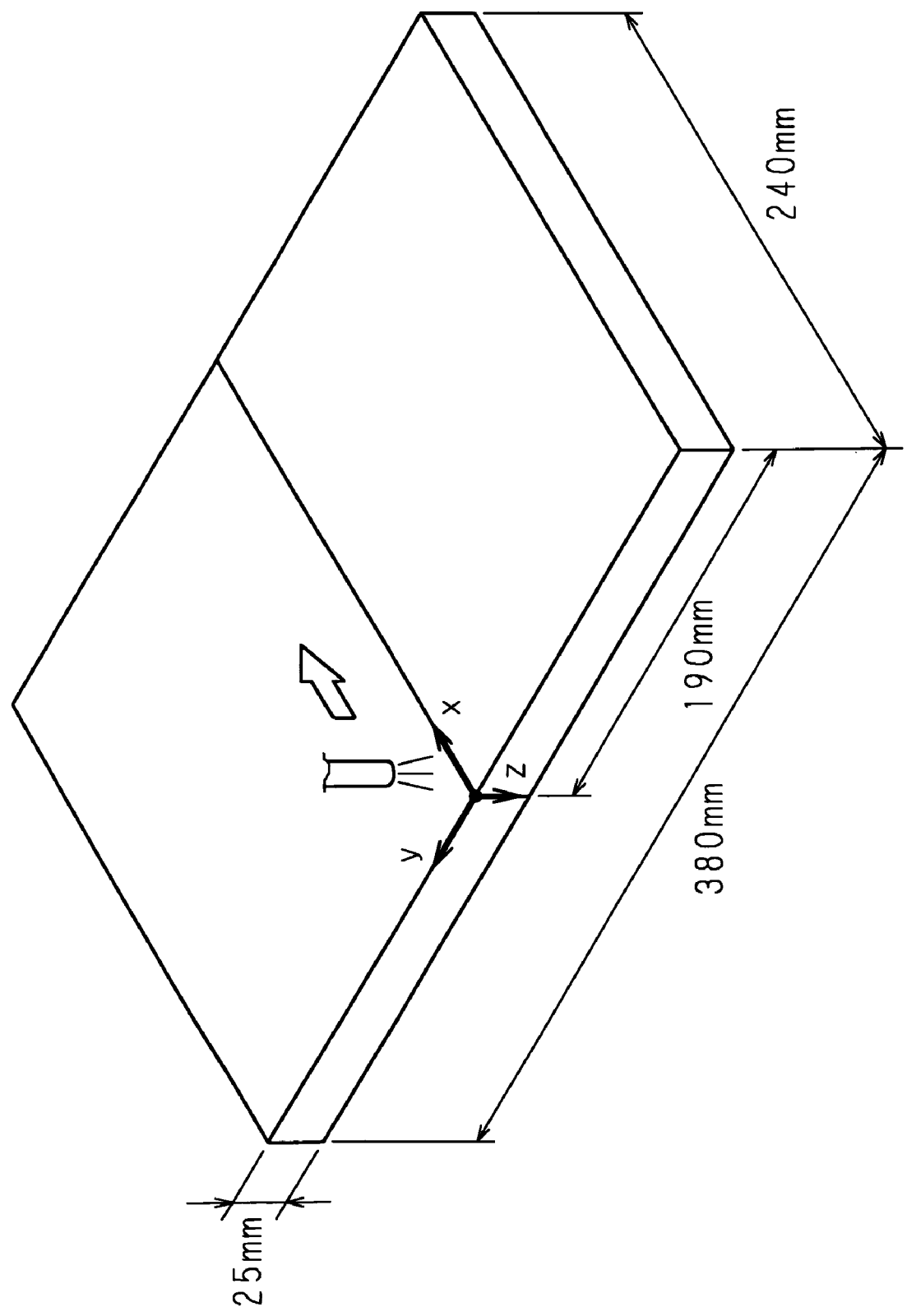
FIG. 2 is a schematic diagram of an object to be deduced of welding deformation used in the present embodiment.

An operation of computation processing of welding deformation in the welding deformation computing device 1 with the above-described configuration will be described below. FIG. 2 is a schematic diagram of an object to be deduced of welding deformation used in the present embodiment. In an example of the object to be deduced shown in FIG. 2, two steel sheets with length, width, and thickness of 190 mm, 240 mm, and 25 mm respectively are welded. Welding is performed to a thick solid line in the center on the surface. For one steel sheet of the object to be deduced, it is assumed below that the length direction is the y axis, the width direction is the x axis, and the thickness direction is the z axis.

Welding heat input is executed along the x axis. In welding, regions for which nonlinear analysis is necessary due to a magnitude of yield stress or a change in physical properties caused by temperature are those regions whose temperature rises to about 200° C. or more and are limited to narrow regions within about 50 mm from a weld line. FIG. 3 is a diagram illustrating a temperature distribution when welding heat input is executed. As shown in FIG. 3, while isothermal lines near a welding heat input portion are dense, they become sparser with distance from the welding heat input portion. Therefore, an assumption that regions for which nonlinear analysis is necessary are concentrated near the welding heat input portion along the x axis is within a range of computation errors of the welding deformation. In regions a predetermined distance apart from the welding heat input portion, on the other hand, the stress is smaller than the yield stress and the temperature is lower than a temperature at which a change in physical properties occurs and thus welding deformation can reasonably accurately be determined by carrying out linear analysis.

Figure 4A:
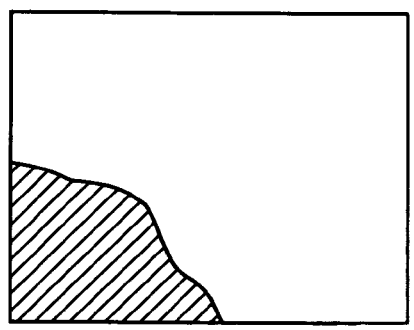
FIG. 4A, FIG. 4B and FIG. 4C are illustrations of a method for specifying a limit surface of a region for which nonlinear analysis is necessary.
Figure 4B:
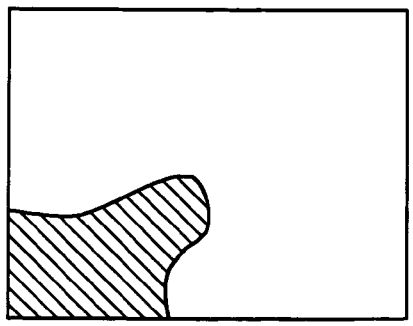
Figure 4C:
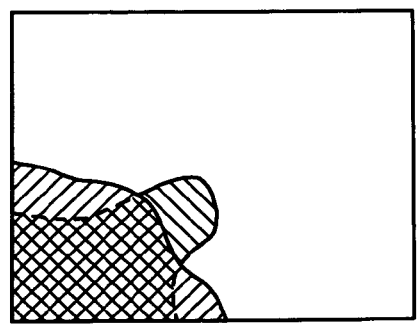

Then, a region for which nonlinear analysis is necessary due to a magnitude of yield stress or a change in physical properties caused by temperature, for example, a region denoted by a broken line in FIG. 3 is specified. FIG. 4A, FIG. 4B and FIG. 4C are illustrations of a method for specifying a limit surface of a region for which nonlinear analysis is necessary. When the stress exceeds the yield stress, plastic deformation occurs and thus linear analysis cannot be carried out. Consequently, as shown in a shaded area in FIG. 4A, a region in which the stress is larger than the yield stress is specified as a region for which nonlinear analysis is necessary. That is, with a surface on which the stress is equal to the yield stress as a limit surface, the stress becomes larger as distance to the welding heat input portion diminishes, but the yield stress becomes smaller.

When the temperature distribution is as shown by isothermal lines in FIG. 4B, a change in physical properties occurs in a region in which the temperature is higher than a predetermined temperature, shown as a shaded area, and thus linear analysis cannot be carried out. Therefore, the region in which the temperature is higher than the predetermined temperature, shown as the shaded area in FIG. 4B, is specified as a region for which nonlinear analysis is necessary. That is, with a surface on which the temperature is equal to the predetermined temperature as a limit surface, the temperature becomes higher as distance to the welding heat input portion diminishes.

Nonlinear analysis must be carried out for a region included in either the shaded area in FIG. 4C or the shaded area in FIG. 4B. Therefore, as shown in FIG. 4C, a region for which nonlinear analysis is necessary is a region determined as a union of the shaded area in FIG. 4A and the shaded area in FIG. 4B. Though a region for which nonlinear analysis is necessary is determined as a union in the example of FIG. 4A, FIG. 4B and FIG. 4C, but the present invention is not limited to this method and the region may be determined as a product set or as a union of a plurality of regions determined as product sets.

Figure 5:
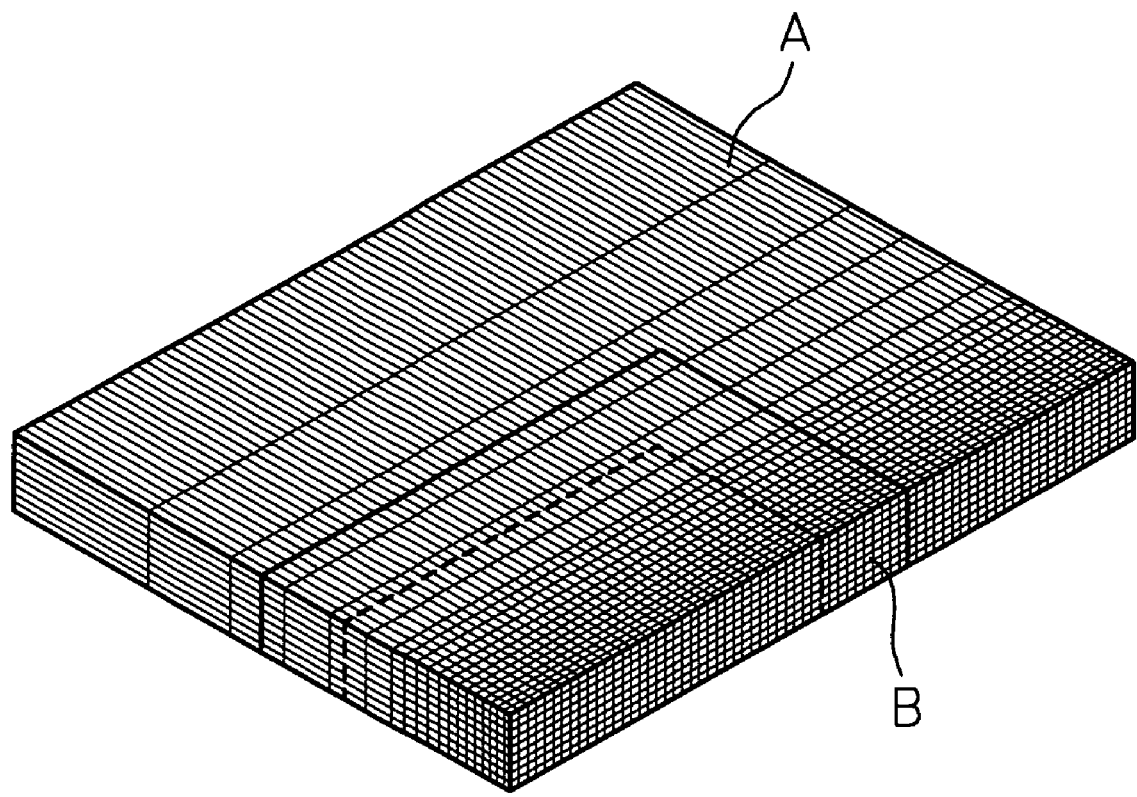
FIG. 5 is an illustration of a concept of a welding deformation computing method according to the present embodiment.
Figure 5:
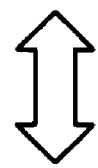
Figure 5:
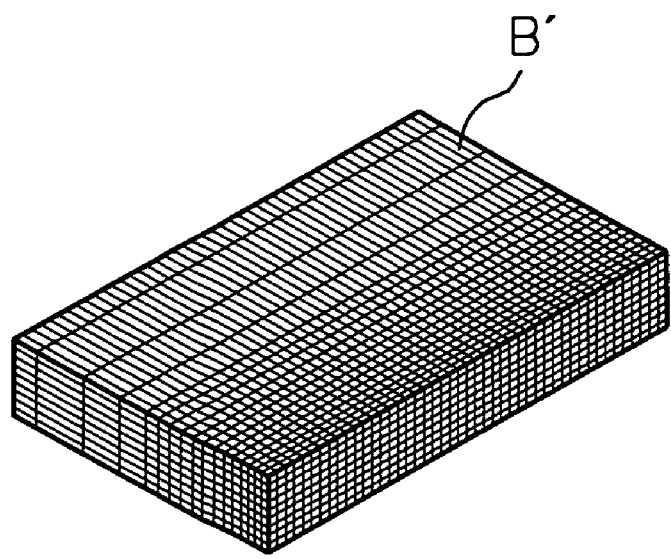

In the present embodiment, the computation processing time is significantly reduced by carrying out nonlinear analysis only for regions for which nonlinear analysis is necessary and linear analysis for other regions. FIG. 5 is an illustration of a concept of the welding deformation computing method according to the present embodiment. Nonlinear analysis is carried out for a region B, which is a region enclosed by a boundary surface a little larger than a region specified as a limit surface denoted by a broken line in FIG. 5, and displacement of the boundary surface is computed by iterative operations as a converged value.

First, displacement and a reaction force at the boundary surface are computed by carrying out linear analysis for a whole object to be welded. That is, displacement and a reaction force at an initial boundary surface are computed by replacing the region B extracted as a region enclosed by the boundary surface with a pseudo-linear partial region B' whose rigidity does not change.

Since it is assumed that rigidity of the pseudo-linear partial region B' does not change, displacement and a reaction force can be computed by carrying out linear analysis. Also, since linear analysis can be carried out for other regions than a region extracted as a region enclosed by the boundary surface, continuity at the boundary surface can be maintained by providing displacement at the boundary surface computed here as a boundary condition for nonlinear analysis.

Regarding the region B extracted as a region enclosed by the boundary surface, boundary surface conditions using coordinates (x, y, z) are stored in the RAM 14. For example, conditions such as $0<x<x1$ and $0<y<y1$ are stored.

Converged displacement is stored in the RAM 14 as a function of the coordinates (x, y, z). For example, like d1 (x1, y1, z1), d2 (x2, y2, z2), . . . , the displacement at each coordinate point by FEM division is stored.

Next, force acting on the boundary surface is computed based on displacement of the computed boundary surface. That is, reaction force on the boundary surface caused by displacement generated at the boundary surface is computed. The reaction force is also computed by iterative operations as a converged value and stored in the RAM 14 as a function of the coordinates (x, y, z). For example, like r1 (x1, y1, z1), r2 (x2, y2, z2), . . . , the reaction force at each coordinate point by FEM division is stored.

Then, when a degree of continuity between the reaction force r1 (x1, y1, z1), r2 (x2, y2, z2), . . . stored in the RAM 14 and the reaction force at the boundary surface computed by carrying out pseudo-linear analysis for the whole object to be welded is checked and a difference between the two reaction forces converges to within a predetermined range, the welding deformation will be computed with the same accuracy as that when nonlinear analysis is carried out for the whole object to be welded.

When the difference between the two reaction forces is larger than a predetermined value, an amount of correction of the displacement at the boundary surface is computed based on the reaction force r1 (x1, y1, z1), r2 (x2, y2, z2) . . . stored in the RAM 14, the reaction force generated in regions for which nonlinear analysis is necessary is corrected using the computed amount of correction of the displacement, and the above processing is performed repeatedly.

When the difference between the two reaction forces is smaller than a predetermined value, a stress is computed based on the displacement d1 (x1, y1, z1), d2 (x2, y2, z2), . . . stored in the RAM 14 and the displacement and stress are outputted to the outputting means 17 as welding deformation to be determined.

With the above processing, welding deformation at a predetermined time point is computed and a new boundary surface is specified in reference to the computed stress and temperature. The object to be welded is again divided into regions for which nonlinear analysis is necessary and regions for which nonlinear analysis is not necessary based on the specified new boundary surface and, by performing the above processing repeatedly, welding deformation can be computed in time sequence.

Figure 6:
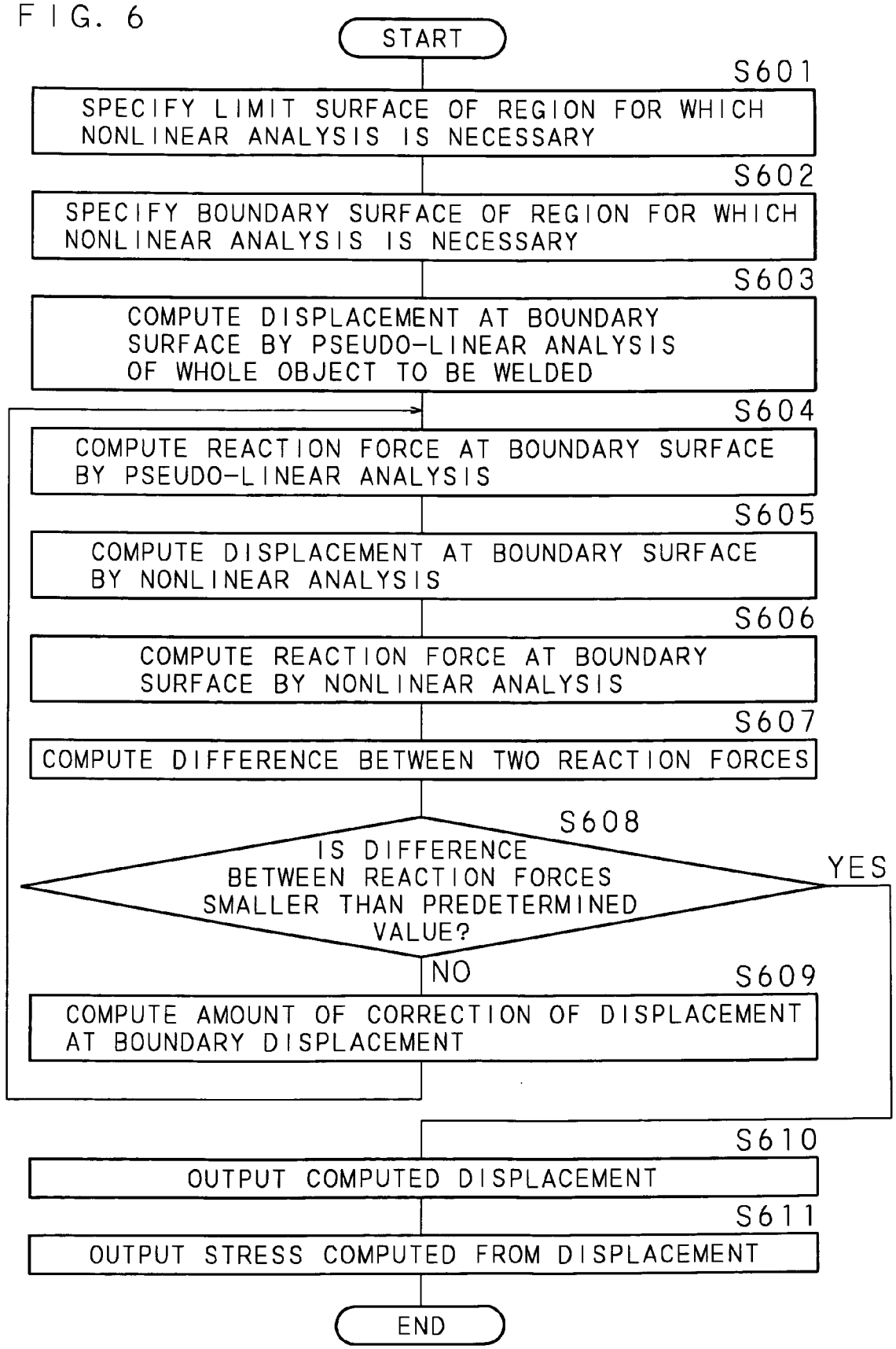
FIG. 6 is a flow chart showing a procedure for welding deformation computation processing in a CPU of the welding deformation computing device according to the embodiment of the present invention.

FIG. 6 is a flow chart showing a procedure for welding deformation computation processing in the CPU 11 of the welding deformation computing device 1 according to the embodiment of the present invention. FIG. 6 shows the processing procedure for determining welding deformation at a predetermined time point. A control program for performing the welding deformation computation processing is stored in the ROM 13 or installed into the storing means 12 using a (portable) recording medium 2 such as CD-ROM and DVD, which are auxiliary storing means 18.

In FIG. 6, the CPU 11 specifies coordinate conditions for a limit surface of a region for which nonlinear analysis is necessary due to a magnitude of stress or a change in physical properties caused by temperature at a predetermined time point (step S601). Then, the CPU 11 specifies coordinate conditions for a boundary surface based on the specified limit surface of the region for which nonlinear analysis is necessary (step S602).

Next, the CPU 11 carries out pseudo-linear analysis for the whole object to be welded including the region for which nonlinear analysis is necessary extracted based on the coordinate conditions for the boundary surface and computes displacement at the boundary surface (step S603) to store the displacement in the RAM 14 as d1 (x1, y1, z1).

The CPU 11 computes a reaction force at the boundary surface based on the displacement (step S604), which is a result of carrying out pseudo-linear analysis for the whole object to be welded including the region for which nonlinear analysis is necessary, to store the reaction force in the RAM 14 as r1 (x1, y1, z1).

On the other hand, the CPU 11 carries out nonlinear analysis for the region for which nonlinear analysis is necessary, extracted by the coordinate conditions at the boundary surface and computes displacement at the boundary surface (step S605) to store the displacement in the RAM 14 as d2 (x1, y1, z1).

The CPU 11 computes a reaction force at the boundary surface based on the displacement (step S606), which is a result of carrying out nonlinear analysis for the region for which nonlinear analysis is necessary, to store the reaction force in the RAM 14 as r2 (x1, y1, z1).

The CPU 11 computes a difference $\Delta r$ (x1, y1, z1) between the reaction forces r1 (x1, y1, z1) and r2 (x1, y1, z1) (step S607) and judges whether the difference $\Delta r$ (x1, y1, z1) of the reaction forces is smaller than a predetermined value (step S608).

When the CPU 11 judges that the difference of the reaction forces is larger than the predetermined value (step S608: NO), the CPU 11 computes an amount of correction of displacement at the boundary surface based on the difference between the reaction forces r1 (x1, y1, z1) and r2 (x1, y1, z1) stored in the RAM 14 (step S609) and then returns to step S604.

When the CPU 11 judges that the difference of the reaction forces is smaller than the predetermined value (step S608: YES), the CPU 11 outputs the computed displacement stored in the RAM 14 to the outputting means 17 (step S610). The CPU 11 also computes a stress based on the outputted displacement and outputs to the outputting means 17 (step S611).

After computing the displacement and stress, which are welding deformation at a predetermined time point, the CPU 11 specifies a new boundary surface based on the determined displacement to make it possible to determine welding deformation at any time in time sequence by dividing an object to be welded into a plurality of regions composed of regions for which linear analysis is sufficient and regions for which nonlinear analysis is necessary based on the new boundary surface and performing the above processing repeatedly.

Generally, a computation time for solving an equation of degree n (n is a natural number) shown in the following equation (2) is proportional to $n^3$ in the first iteration. In the second and subsequent iterations, when a stiffness matrix does not change and only an acting force changes, the computation time is proportional to $n^2$. In the equation (2), K, u, and f denote a stiffness matrix, displacement, and an acting force respectively.

$$[K]\{u\}=\{f\} \qquad (2)$$

When the whole object to be welded is linear, the stiffness matrix K does not change even if the acting force f changes. Then, when $n_N$ ($n_N$ is a natural number) unknowns (assumed to be $n_N < n/10$) exist in a nonlinear region, which is part of the object to be welded, a nonlinear problem of degree $n_N$ will have to be solved. Consequently, the computing time will be approximately proportional to $m_{iN} \times n_N^3$ ($m_{iN}$ is a natural number), where $m_{iN}$ is the number of times of convergence computation repeated in each step of nonlinear analysis.

When the whole object to be welded can be assumed to be a combination of a region for which pseudo-linear analysis is carried out and a region for which nonlinear analysis is necessary, both continuity of displacement and balance of force must be satisfied at the boundary surface between the region for which pseudo-linear analysis is carried out and the region for which nonlinear analysis is necessary. Continuity of displacement at the boundary surface can be satisfied by equalizing displacement at a boundary surface of the whole object to be welded obtained by replacing the region for which nonlinear analysis is necessary with a region for which pseudo-linear analysis is carried out with displacement at the boundary surface of the region for which nonlinear analysis is necessary.

In contrast, the balance of force must be forced to converge by iterative operations at the boundary surface and the computing time thereof is approximately proportional to the following equation (3). In the equation (3), $m_s$ ($m_s$ is a natural number) denotes the number of steps divided by a short time interval for carrying out nonlinear analysis and $m_i$ ($m_i$ is a natural number) denotes the number of times of convergence computation in each step.

$$n^3+m_s \times m_i(m_{iN} \times n_N^3+n^2) \qquad (3)$$

Therefore, while the computation time generally increases in proportion to the equation (1), the computation time by the welding deformation computing method according to the present embodiment increases in proportion to the equation (3). Thus, the following equation (4) is obtained by dividing the equation (3) by the equation (1).

$$1/(m_s \times m_i)+(m_{iN} \times n_N^3+n^2)/n^3=1/(m_s \times m_i)+m_{iN}/1000+1/n \qquad (4)$$

Thus, since substituting $m_s=100$, $m_i=5$, $m_{iN}=5$, and n=100000 into the right-hand side of the equation (4) yields about 1/200, the computation time of welding deformation can be reduced to about 1/200 by using the welding deformation computing method according to the present embodiment.

According to the present embodiment, as described above, by computing welding deformation by applying nonlinear analysis to regions for which nonlinear analysis must be carried out and linear analysis to regions for which welding deformation can reasonably accurately be computed by carrying out only linear analysis respectively, the computation time of welding deformation can significantly be reduced without carrying out nonlinear analysis for the whole object to be welded and consuming computer resources uselessly.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A welding deformation computing method for computing welding deformation of an object to be welded, comprising:

extracting a nonlinear region for which nonlinear analysis using FEM (Finite Element Method) should be carried out in said object to be welded, the extracting including
specifying a limit surface representing a limit of said nonlinear region based on at least one of a stress distribution of said object to be welded and a temperature distribution of said object to be welded;
computing displacement of said limit surface by linear analysis;
computing a first reaction force from said limit surface to said nonlinear region by linear analysis;
computing a second reaction force from said nonlinear region to said limit surface by nonlinear analysis based on the displacement of said limit surface computed in said computing displacement;
computing a difference between said first reaction force and said second reaction force;
judging whether a magnitude of the difference computed in said computing a difference is larger than a predetermined value;
correcting the displacement of said limit surface specified in said specifying a limit surface based on the magnitude of the difference computed in said computing a difference when it is judged in said judging that the magnitude of said difference is larger than said predetermined value; and
computing welding deformation of said nonlinear region of said object to be welded by carrying out the nonlinear analysis using FEM based on the displacement of said limit surface computed in said computing displacement when it is judged in said judging that the magnitude of said difference is not larger than said predetermined value.

2. A welding deformation computing device for computing welding deformation of an object to be welded, comprising:

an extracting unit configured to extract a nonlinear region for which nonlinear analysis should be carried out using FEM (Finite Element Method) in said object to be welded, the extracting unit including
a limit surface specifying unit configured to specify a limit surface representing a limit of said nonlinear region based on at least one of a stress distribution of said object to be welded and a temperature distribution of said object to be welded;
a linear displacement computing unit configured to compute displacement of said limit surface by linear analysis;
a first reaction force computing unit configured to compute a first reaction force from said limit surface to said nonlinear region by linear analysis;
a second reaction force computing unit configured to compute a second reaction force from said nonlinear region to said limit surface by nonlinear analysis based on the displacement of said limit surface computed by said linear displacement computing unit;
a difference computing unit configured to compute a difference between said first reaction force and said second reaction force;
a judging unit configured to judge whether a magnitude of the difference computed by said difference computing unit is larger than a predetermined value;
a correcting unit configured to correct the displacement of said limit surface specified by said limit surface specifying unit based on the magnitude of the difference computed by said difference computing unit when it is judged by said judging unit that the magnitude of said difference is larger than said predetermined value; and
a welding deformation computing unit configured to compute welding deformation of said object to be welded by carrying out the nonlinear analysis using FEM based on the deformation of said limit surface computed by said linear displacement computing unit when it is judged by said judging unit that the magnitude of said difference is not larger than said predetermined value.

3. A computer readable storage medium having computer readable program code encoded in said medium, wherein said computer readable program code, when executed by a computer, causes the computer to perform a method comprising:

extracting a nonlinear region for which nonlinear analysis using FEM (Finite Element Method) should be carried out in said object to be welded, the extracting including
specifying a limit surface representing a limit of said nonlinear region based on at least one of a stress distribution of said object to be welded and a temperature distribution of said object to be welded;
computing displacement of said limit surface by linear analysis;
computing a first reaction force from said limit surface to said nonlinear region by linear analysis;
computing a second reaction force from said nonlinear region to said limit surface by nonlinear analysis based on said computed displacement of the limit surface;
computing a difference between said first reaction force and said second reaction force;
judging whether a magnitude of said difference is larger than a predetermined value;
correcting said displacement of said limit surface based on the magnitude of said difference when it is judged that the magnitude of said difference is larger than said predetermined value; and
computing welding deformation of said nonlinear region of said object to be welded by carrying out the nonlinear analysis using FEM based on the displacement of said limit surface when it is judged that the magnitude of said difference is not larger than said predetermined value.

* * * * *